(12) United States Patent
Bush et al.

(10) Patent No.: US 10,883,921 B2
(45) Date of Patent: Jan. 5, 2021

(54) COMPLEMENTARY SAFETY SYSTEMS FOR LASER INDUCED BREAKDOWN SPECTROSCOPY

(71) Applicant: Thermo Scientific Portable Analytical Instruments Inc., Tewksbury, MA (US)

(72) Inventors: Michael Bush, Arlington, MA (US); Eric A. Martin, Medford, MA (US); David Perez, Milford, MA (US); Michael Hargreaves, Burlington, MA (US); Lin Zhang, Andover, MA (US); Xiaofeng Tan, Acton, MA (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 40 days.

(21) Appl. No.: 16/036,286

(22) Filed: Jul. 16, 2018

(65) Prior Publication Data

US 2019/0017922 A1    Jan. 17, 2019

Related U.S. Application Data (60) Provisional application No. 62/533,354, filed on Jul. 17, 2017.

(51) Int. Cl.
*G01N 21/01* (2006.01)
*G01N 21/71* (2006.01)
(Continued)

(52) U.S. Cl.
CPC .............. *G01N 21/01* (2013.01); *G01J 3/027* (2013.01); *G01J 3/10* (2013.01); *G01J 3/443* (2013.01);
(Continued)

(58) Field of Classification Search
CPC ................. G01N 21/01; G01N 21/718; G01N 2201/0221; G01J 3/443; G01J 3/027; G01J 3/10
See application file for complete search history.

(56) References Cited

U.S. PATENT DOCUMENTS 5,751,416 A * 5/1998 Singh ...................... G01J 3/021
356/311
7,394,537 B1 7/2008 Lindfors et al.
(Continued)

FOREIGN PATENT DOCUMENTS

WO  WO-2008131558 A1  11/2008

OTHER PUBLICATIONS

International Search Report and Written Opinion for Application No. PCT/US2018/042270, dated Jan. 22, 2019, 20 pages.
(Continued)

*Primary Examiner* — Mohamed K Amara
(74) *Attorney, Agent, or Firm* — William R. McCarthy, III (57) ABSTRACT

In the operation of analytical devices, and particularly laser induced breakdown spectroscopy (LIBS) devices, a number of advantages may be obtained by the use of complementary safety mechanisms, such as those that govern the operation or firing of a laser. Such complementary safety mechanisms, compared to the individual safety mechanisms acting alone, prevent operation of the laser under a greater number of unsafe circumstances (even if one or more detected conditions are safe, based on not activating the associated safety mechanism) and permits operation under a greater number of safe circumstances (even if one or more detected conditions are unsafe, based on activating the associated safety mechanism).

15 Claims, 6 Drawing Sheets

(51) Int. Cl.
*G01J 3/10* (2006.01)
*G01J 3/02* (2006.01)
*G01J 3/443* (2006.01)

(52) U.S. Cl.
CPC ... *G01N 21/718* (2013.01); *G01N 2201/0221* (2013.01)

(56) References Cited

U.S. PATENT DOCUMENTS

| | | | | |
|---|---|---|---|---|
| 7,557,917 | B1* | 7/2009 | Beesley | G01N 21/718 |
| | | | | 356/30 |
| 7,821,634 | B2 | 10/2010 | Dillon et al. | |
| 9,255,900 | B2 | 2/2016 | Fishbine | |
| 9,395,243 | B2 | 7/2016 | Day et al. | |
| 9,535,563 | B2* | 1/2017 | Hoffberg | G06Q 30/0255 |
| 9,546,945 | B2* | 1/2017 | Ryaboy | F16F 15/002 |
| 9,651,424 | B2 | 5/2017 | Day et al. | |
| 10,036,703 | B1* | 7/2018 | Ng | G01J 3/0291 |
| 2008/0100835 | A1* | 5/2008 | Ban | G01J 3/4412 |
| | | | | 356/301 |
| 2008/0212074 | A1* | 9/2008 | Goulter | G01J 3/02 |
| | | | | 356/51 |
| 2008/0249380 | A1 | 10/2008 | Van Beek et al. | |
| 2009/0290151 | A1* | 11/2009 | Agrawal | G01N 21/03 |
| | | | | 356/318 |
| 2010/0022400 | A1* | 1/2010 | Ugolin | G01N 21/718 |
| | | | | 506/7 |
| 2010/0047916 | A1* | 2/2010 | Rothschild | G01J 3/10 |
| | | | | 436/98 |
| 2010/0264820 | A1* | 10/2010 | Sumitomo | H01J 65/04 |
| | | | | 313/639 |
| 2012/0217422 | A1* | 8/2012 | Yabu | H05G 2/006 |
| | | | | 250/504 R |
| 2014/0204378 | A1 | 7/2014 | Day et al. | |
| 2015/0103334 | A1 | 4/2015 | Quant et al. | |
| 2015/0286299 | A1* | 10/2015 | Bacon | G06F 3/03545 |
| | | | | 345/167 |
| 2018/0188225 | A1* | 7/2018 | Viscarra Rossel | G01N 23/04 |

OTHER PUBLICATIONS

Partial International Search Report for Application No. PCT/US2018/042270 dated Oct. 23, 2018, 12 pages.
Notification Concerning Transmittal of International Preliminary Report of Patentability dated Jan. 30, 2020, to PCT Application No. PCT/US2018/-42270.

* cited by examiner

COMPLEMENTARY SAFETY SYSTEMS FOR LASER INDUCED BREAKDOWN SPECTROSCOPY

CROSS-REFERENCE TO RELATED APPLICATION

This application claims the benefit of U.S. provisional patent application No. 62/533,354, filed Jul. 17, 2017. The content of this application is incorporated by reference in its entirety.

FIELD OF THE INVENTION

The present invention relates to complementary safety mechanisms for use in devices, such as portable (e.g., hand-held) analytical devices, including laser induced breakdown spectroscopy (LIBS) devices. The combination of safety mechanisms provides for the detection of multiple safety-related conditions to improve overall performance.

BACKGROUND OF THE INVENTION

Analytical techniques are known in which a high-energy plasma of a sample is first formed, which, upon cooling generates a characteristic emission spectrum. More specifically, during this cooling, electrons of atoms and ions at the excited electronic states of the plasma return to their lower energy or ground states, causing the emission of radiation at discreet wavelengths, corresponding to the changes in energy levels. Every element in the periodic table is associated with unique spectral emission lines that may be detected in the visible portion of the electromagnetic spectrum. Emitted light from plasma may therefore be collected and coupled with a spectrometer to resolve the spectral distribution of emissions for the elements in the sample. The intensity of each spectrum can be used to determine the concentration of each associated element.

In laser-induced breakdown spectroscopy (LIBS), high temperature plasma formation occurs upon focusing a short-pulse laser beam onto the surface of a sample, with sufficient power density such that a small quantity of the sample is ablated, or removed by both thermal and non-thermal transformations. The sample may in principle be solid, liquid, or gaseous, although in the last case the concept of a "surface" does not exist and the laser is focused into a contained sample of the gas. Regardless of the state of matter, optical emissions from the resulting plasma plume are collected with the appropriate light collection optics, and the spectral distribution (i.e., intensity versus wavelength) of the optical emissions is detected by a spectrometer and converted into electronic form for analysis by a processor. The spectral distribution information obtained by the spectrometer can therefore reveal the atomic and molecular constituents, each with its own characteristic optical emission spectrum, of that part of the sample to which the laser beam was directed.

LIBS provides a simple, reliable, and fast method that is especially suitable for the analysis of metallic samples by resolving their component elements. Concentrations may be accurately determined over a wide range that extends down to parts per million (ppm) levels. For these reasons, LIBS has found widespread applicability in metal-producing industries such as foundries and steel manufacturing, in the analysis of wire (e.g., weld wire) to ensure compliance with composition standards, in the characterization of scrap metal for sorting purposes, and in many other applications.

A drawback of known LIBS measurement devices is limited applicability to field use due to their bulky structures. Traditionally, LIBS has been restricted to use under laboratory conditions. However, more recent efforts have attempted to reduce the form factor of LIBS devices, as evidenced by U.S. Pat. Nos. 7,394,537 and 7,821,634. In view of these advancements directed toward the commercialization of portable (e.g., hand-held) LIBS devices for users in the field to obtain direct, on-site composition analysis of samples, a number of safety-related concerns have materialized. The most apparent hazard faced by the user of a portable LIBs device, or by a neighboring bystander, is accidental exposure to the laser output, and particularly eye exposure. To this end, US 2015/0103334 discloses an "eye-safe" hand-held LIBS device, but the particular laser that is described to obtain this safety feature can significantly compromise the performance of the device. Moreover, the "eye-safe" designation may promote a lack of additional safety precautions being included in the device and/or undertaken by the user.

Certain safety mechanisms can be used to detect potentially unsafe conditions and render the LIBS device temporarily incapable of activating the laser. However, some safety mechanisms are incompatible with certain sample types or testing conditions and may fail to operate in a satisfactory manner by incorrectly preventing operation of the LIBS device when it is actually safe to operate. Accordingly, there remains a need for improvements in analytical devices using lasers, particularly with respect to the safety of such devices in field operation.

SUMMARY

Aspects of the invention relate to the discovery of combinations of safety mechanisms are complementary and greatly diminish the likelihood that the laser in a portable (e.g., hand-held) laser induced breakdown spectroscopy (LIBS) device will fire in an unsafe manner, for example in a way that endangers the user or bystander, particularly if directed to an eye of such person. The problem of ensuring safety is complicated by the variety of sample types that may be potentially analyzed using such a device under various testing conditions where certain safety mechanisms may identify a sample type or testing condition as unsafe when, in fact, a safe state of operation exists. For example, sample types can include conductive or non-conductive samples, substantially transparent or opaque samples, and/or samples having holes or voids. The possible variations in sample types, particularly with respect to differences in their states of matter, opacity, conductivity, size, and surface features, renders certain safety mechanisms not only incompatible, but potentially problematic. In the present example, a small sample, a sample having holes, or a sample with a rounded surface may not have the capability of forming a gas tight seal with the sample chamber of a LIBS device to maintain a minimum threshold of chamber pressure, however may have the capability of forming a light tight seal with the sample chamber so that the amount of light in the sample chamber is below a minimum threshold (e.g. indicating that laser pulses would not escape into the open environment with the potential to cause harm). Consequently, the use of a single safety mechanism that activates on the basis of a low measured chamber pressure to prevent firing of the laser would prevent operation of the device when a second complementary safety system based on light levels in the chamber would allow for safe operation of the device because it does not activate when light levels in the chamber are below the threshold value (e.g. activates to prevent operation). Therefore, with the complementary second safety mechanism operation of the device can be allowed due to the identification of a safe condition. However, it will be appreciated that operation of the device is prevented if both the pressure based and light based safety mechanisms activate.

In an alternative example, if a substantially transparent sample that allows transmission of the laser pulses with sufficient power to cause harm is used, the same first pressure based safety mechanism may form a gas tight seal above the threshold value allowing operation but the second light based safety mechanism activates due to detection of light (e.g. ambient light that transmits through the clear sample) then the device correctly prevents firing of the laser due to the unsafe condition.

A single safety mechanism might not provide sufficient protection against unsafe laser emissions. For example, a spectral-feedback based safety mechanism may be used to monitor the received spectral distribution and automatically cease operation of the laser if no sample spectrum is detected. When used in isolation, however, such a safety mechanism may provide inadequate safeguarding against unwanted laser emissions, due to the high speed of the laser timing relative to the speed of the spectral feedback loop. Therefore, aspects of the invention are associated with the discovery of safety systems having two or more safety mechanisms and that address practical considerations associated with portable (e.g., hand-held) LIBS devices. These considerations include, particularly, the often-opposing commercial needs for (i) flexibility in analyzing the wide range of sample types encountered in the field with (ii) safety systems that do not appreciably frustrate this objective but that also provide a high level of protection to the user and neighboring personnel. Embodiments of the invention are therefore directed to safety systems and methods (e.g., implemented using software or hardware components) in which the two or more safety mechanisms are "complementary," meaning that, compared to these mechanisms acting alone, they can act in combination to (i) improve the chance that the laser will not be improperly locked out in a safe circumstance (when it is safe to fire), such as onto a particular sample type as described herein, (ii) improve the chance that the laser will not fire in an unsafe circumstance, or, preferably, (iii) a combination of both (i) and (ii). According to more particular embodiments, the combined use of complementary safety mechanisms can (i) permit safe operation of the laser for a given "measurement challenge" (e.g., sample type), even if one or more of the safety mechanisms is activated (e.g., based on detection of a potentially unsafe condition) and/or (ii) prevent unsafe operation of the laser if a particular subset of the safety mechanisms is activated, regardless of whether any remaining safety mechanism(s) is/are activated.

According to one aspect, the present disclosure is directed to the use of two or more safety mechanisms (also sometimes referred to as "interlock features") in a device as described herein. Such safety interlock features may include a gas pressure interlock feature, a light interlock feature, an inductive sensing feature, a mechanical proximity sensing feature, an optical proximity sensing feature or a spectral feedback sensing feature as is known in the art or as described herein. The selection or use of any particular safety interlock feature can be determined by the device, such as a LIBS instrument, and/or the material to be analyzed, such as a gas, liquid or solid. Each interlock feature may be defeated in a different way due to incompatibility with certain sample types. According to the present disclosure, use of a combination of safety interlock features, some of which can be defeated in a particular way, provides a high level of certainty that the device will operate in a manner that does not cause harm to an individual. According to one aspect, the device is programmed to select one or more of appropriate available safety mechanisms within the device. According to one aspect, the device is programmed to select two or more of appropriate available safety mechanisms within the device. According to this aspect, redundancy or backup or multiple use of safety mechanisms improves safety to the operator or others within proximate space of the device.

Other aspects of the invention relate to important advantages in the interpretation of multiple, detected conditions, each of which in isolation may be a potentially unsafe condition. Whereas each individual detected condition (depending on its measured value) may potentially activate a particular safety mechanism, specific combinations of detected conditions that activate one or more safety mechanisms may be associated with a given measurement challenge (e.g., sample type) that does not pose a safety issue. Such a specific combination of conditions, when detected, may therefore beneficially permit operation of the laser in a portable LIBS device. Otherwise, a given measurement challenge may in fact pose a safety issue, such that detection of the associated combination of conditions may prevent operation of the laser.

Accordingly, further aspects of the invention relate to the implementation of two or more complimentary safety mechanisms in a LIBS device, in a manner such that limitations inherent in a first safety mechanism may be partly or completely remedied by a second safety mechanism. These limitations may more specifically relate to the inability of one safety mechanism to function in the desired manner for a given sample type. In certain embodiments, the LIBS device may be configured to receive information, such as at a user interface of the device, relating to a particular measurement challenge, such as a sample type. The received information may cause one or more safety mechanisms to be disabled and the remaining safety mechanisms to be operative. In other embodiments, the LIBS device may be configured to provide an output, such as at the user interface of the device, requesting confirmation of the measurement challenge, and further configured to receive a confirmation (or non-confirmation) of the measurement challenge, prior to permitting operation of the laser. A user input of such confirmation may therefore serve as a type of electronic override of a provisional safety mechanism that prevents operation of the laser, pending this confirmation. In yet other embodiments, the LIBS device may be configured to activate a provisional, mechanical safety mechanism (e.g., trigger lock), optionally in conjunction with providing an indication (e.g., display on the user interface) of the measurement challenge. The provisional safety mechanism may be configured for a manual override by the user, upon confirmation of the measurement challenge.

These and other aspects, embodiments, and advantages will become apparent from the following Detailed Description.

The figures should be understood to present illustrations of embodiments of the invention and/or principles involved. As would be apparent to one of skill in the art having knowledge of the present disclosure, other analytical devices, methods, and associated computer program products will have corresponding components, steps, and instructions determined, in part, by their specific use. The modes of operation should be understood as being applicable generally, and do not preclude intervening, pre-, or post-, sub-steps, user-initiated actions, and/or device outputs. Like reference numerals refer to corresponding parts throughout the several views of the drawings.

DETAILED DESCRIPTION OF EMBODIMENTS

Complementary Safety Mechanisms

As described above, aspects of the invention relate to a number of advantages obtained in analytical devices, and particularly laser induced breakdown spectroscopy (LIBS) devices, by the use of complementary safety mechanisms that govern the operation or firing of a laser. Such complementary safety mechanisms perform synergistically in that, compared to the individual safety mechanisms acting alone, the combination prevents operation of the laser under a greater number of unsafe circumstances (e.g. even if one or more detected conditions do not activate an associated safety mechanism) and permits operation under a greater number of safe circumstances (e.g. even if one or more detected conditions do activate an associated safety mechanism).

According to a particular embodiment, operation of the laser of the LIBS device may be prevented when any one of the two or more safety mechanisms is activated. According to another particular embodiment, operation of the laser of the LIBS device may be prevented when at least one of the two or more safety mechanisms is not activated, for example in the case of a combination of detected conditions (and corresponding combination of activated safety mechanisms) being associated with a given measurement challenge, such as an impermissible measurement challenge, as described below. According to yet another particular embodiment, the LIBS device may comprise three or more safety mechanisms, and operation of the laser may be prevented when any two or more safety mechanisms are activated. According to yet another particular embodiment, the LIBS device may comprise three or more safety mechanisms, and operation of the laser may be prevented when a combination of detected conditions is associated with a measurement challenge, for example an impermissible measurement challenge as described below, that does not activate at least one of the three or more safety mechanisms. According to yet another particular embodiment, operation of the laser may be permitted when at least one of two or more safety mechanisms is activated, for example when a combination of detected conditions is associated with a measurement challenge, for example a permissible measurement challenge, as described below. In any of these embodiments, a determination of whether operation of the laser is permitted or prevented may be based on the detected conditions (e.g., detected parameter within the sample chamber and/or detected position of the sample) at the time of (e.g., within 5 seconds of, within 2 seconds of, or within 1 second of) receipt of a user input signal, such as depressing a trigger of the device to initiate an analysis.

As alternatives and equivalents of "safety mechanisms", the terms "lockout" and "interlock" may be used. These terms are recognized in the art and are descriptive of components that have the ability, upon activation by receiving or detecting a measured condition (e.g., that is above or below a threshold value of the condition), to lock or prevent operation of the LIBS device (e.g., prevent operation of the laser).

A number of safety mechanisms are described herein, and particularly with respect to the types of conditions that are detected as a basis for activating them. As described herein, it is presumed that detection of an unsafe condition by a safety mechanism (e.g., having a value that is above or below a threshold value, as the case may be) causes the respective safety mechanism to become "activated". Particular safety mechanisms described below include "chamber-environment based" safety mechanisms, "sample-position based" safety mechanisms, and "spectral-feedback based" safety mechanisms. These are to be understood as categories of safety mechanisms that embrace a number of possible, specific apparatuses, having sensors and other associated components, which function by detecting a given condition. It is also to be understood that these particularly described safety mechanisms are exemplary and not exhaustive, such that the invention can be implemented with other safety mechanisms or otherwise with the herein-described safety mechanisms in combination with other safety mechanisms. Moreover, the use of "two or more" safety mechanisms according to aspects of the invention can be satisfied by two safety mechanisms of the same type (i.e., within the same category), such as a first chamber-environment based safety mechanism that is activated when the detected parameter within the sample chamber is a measured pressure that is below a threshold pressure, and a second chamber-environment based safety mechanism that is activated when the detected parameter within the sample chamber is a measured light intensity that exceeds a threshold light intensity. In some embodiments, a subset of the safety mechanisms may be disabled in using the device in connection with a measurement challenge that adversely impacts this subset.

Representative Embodiments

Embodiments of the invention are directed to a portable (e.g., hand-held) laser induced breakdown spectroscopy (LIBS) device, comprising: a laser configured to direct a laser beam through a sample chamber and to an exit configured for engaging (e.g., abutting) a surface of a sample to be analyzed. Typically, therefore, the laser beam is directed onto the surface of a sample. The device may further comprise a spectrometer for determining a spectral distribution of emissions from the sample, upon being subjected to energy from the laser beam. Advantageously, the device may have two or more safety mechanisms, selected from the group consisting of: (i) a chamber-environment based safety mechanism that receives (e.g., can, in some cases, prevent operation or firing of the laser, depending on) a detected parameter within the sample chamber; (ii) a sample-position based safety mechanism that receives (e.g., can, in some cases, prevent operation or firing of the laser, depending on) a detected position (or detected absence) of the sample (i.e., a "detected position" includes a detection that the sample is absent); and (iii) a spectral-feedback based safety mechanism that receives (e.g., can, in some cases, prevent operation or firing of the laser, depending on) the spectral distribution from the spectrometer.

Yet further embodiments of the invention are directed to a portable (e.g., hand-held) device for performing laser induced breakdown spectroscopy (LIBS) on a sample. The device comprises two or more complementary safety mechanisms that receive two or more of (i) a detected parameter within the sample chamber, (ii) a detected position of the sample (e.g., relative to the sample chamber, such as the plane of exit of this chamber, or relative to some other part of the device), and (iii) a spectral distribution of emissions from the sample. Certain combinations of the received conditions (i), (ii), and (iii), such as a subset of all possible combinations, may be represented in the form of a matrix of a plurality of such combinations. Advantageously, each of such combinations of the matrix can be associated with a respective measurement challenge. Typically, each combination of received conditions (such as conditions that activate certain safety mechanisms but do not activate other safety mechanisms) is uniquely associated with a particular measurement challenge, but this is not a requirement of the invention. It is also possible that a certain combination of received conditions is associated (non-uniquely) with two or more different measurement challenges, in which case additional information may be used to resolve a unique measurement challenge. Whether or not the association is unique, the measurement challenge, upon being resolved, can either prevent or permit operation of a laser within the device, depending on the nature of the measurement challenge (e.g., permissible or non-permissible) and particular operational configuration of the device.

Still further embodiments of the invention are directed to a non-transitory computer readable medium having a computer program embodied thereon. The computer program includes instructions for causing a processor to perform (a) receiving inputs (e.g., input signals) from two or more complementary safety mechanisms, with the inputs being indicative of two or more of (i) a detected parameter within the sample chamber, (ii) a detected position of a sample, and (iii) a spectral distribution of emissions from the sample. The inputs may be received by the non-transitory computer readable medium from various sensors/transducers used in a LIBS device, used to detect conditions as described herein. These include a sample chamber pressure transducer, a sample chamber light intensity transducer, a sample proximity transducer (e.g., a sample inductive proximity transducer), a spectral distribution transducer, etc., all of which are able to convert the relevant, detected condition to a signal (e.g., an electrical signal) that is indicative of the condition (e.g., convert a detected pressure of the sample chamber, convert a detected light intensity of the sample chamber, convert a detected proximity of the sample, or convert a detected spectral distribution (or absence of such distribution), to an electrical signal). The instructions may further cause the processor to perform (b) associating the inputs with a measurement challenge, based on a stored matrix of combinations of (i), (ii), and (iii) in association with respective (e.g., potential or putative) measurement challenges.

The instructions may optionally further cause the processor to perform (c) providing an output (1) that prevents or permits operation of a laser, depending on the measurement challenge, or (2) in the form of a provisional safety mechanism that requires further action or input from the user (e.g., an input from the user, confirming the measurement challenge) to permit operation of the laser. In the case of an output in the form of a provisional safety mechanism, therefore, the instructions may further cause the processor to perform (d) receiving the further input, such as at the user interface, being indicative of a confirmation or non-confirmation of the measurement challenge and (e) providing an output that prevents or permits operation of a laser, depending on the further input. In this manner, operation of the laser may be influenced by a user's input, after the detected conditions are evaluated for their potential association with a measurement challenge.

In an alternative embodiment, in step (a) of the steps performed by the processor, a further input is received, such as at the user interface, the further input being indicative of a user input measurement challenge. In this case, the processor performs the alternative step (c) of providing an output that prevents or permits operation of a laser, depending on whether the measurement challenge (associated with the combination of detected conditions) is the same as the user input measurement challenge. For example, if a stored, permissible measurement challenge (e.g., a poor gas seal in combination with a good light seal) is associated with the combination of detected conditions, then the output could permit operation of the laser, on the basis of a match between that permissible measurement challenge and the user input measurement challenge. In this manner, operation of the laser may be influenced by the user's input, before the detected conditions are evaluated for their potential association with a measurement challenge.

Alternatively, use of a non-transitory computer readable medium may be optional where one or more of the safety mechanisms operate without the use of a computer program. For example, a light intensity transducer may be enabled to directly prevent the laser from firing without use of a computer program. In the present example, activation of the light intensity transducer may always be associated with an impermissible measurement challenge and thus there is no need to computationally compare the activation information against the matrix. Typically, such direct coupling of the safety mechanism with the laser results in significantly faster response time to prevent firing over performing computations and sending instructions from a processor.

Figure 1:
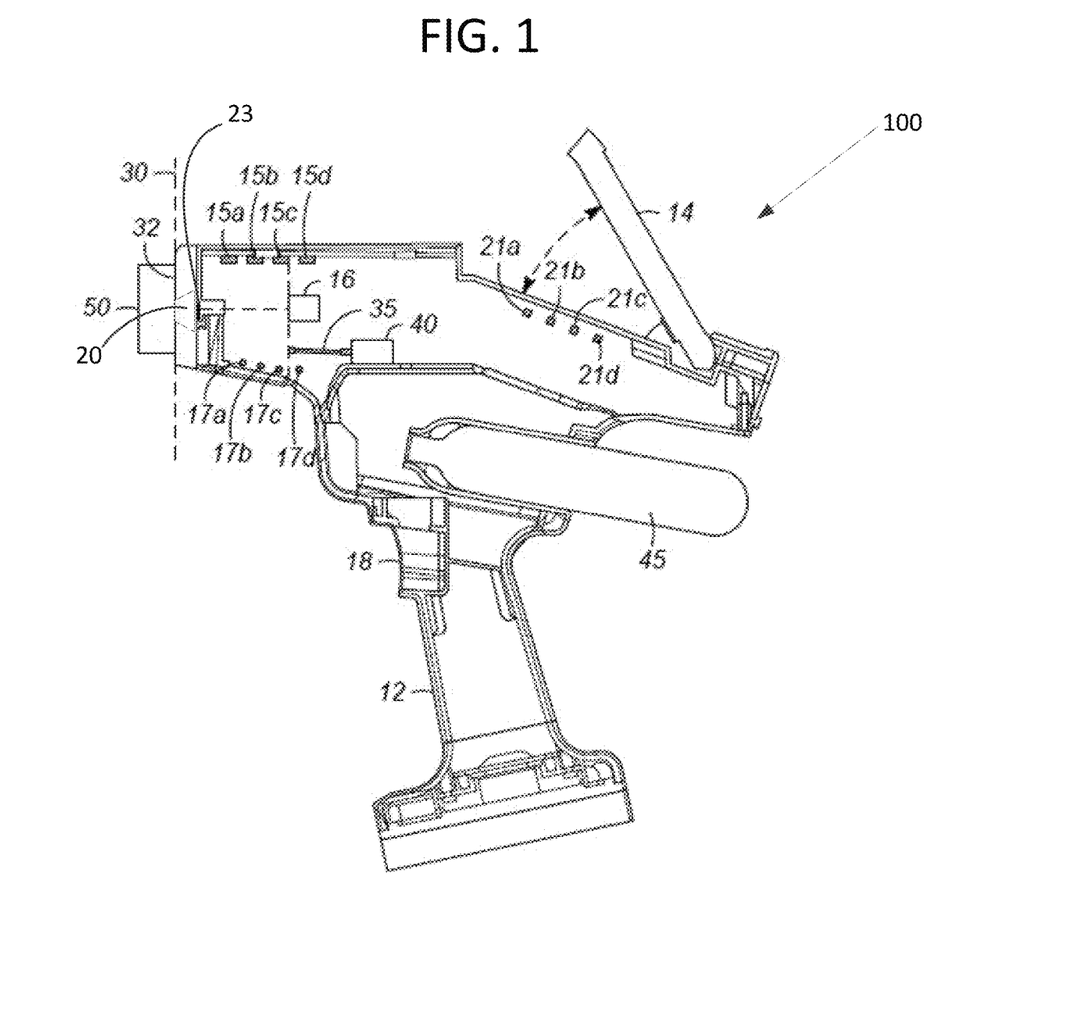
FIG. 1 illustrates an embodiment of a hand-held laser induced breakdown spectroscopy (LIBS) device.

FIG. 1 illustrates a hand-held LIBS device 100 having hand grip 12 and user interface 14 through which information relating to an analysis can be input from a user and information can be received by the user. Such information includes the input and receipt of detected conditions, a safe or unsafe circumstance (e.g., based on a combination of detected conditions), and/or measurement challenges as described herein. As shown, user interface 14 may be pivoted from out of an upper plane of the device for ease of use. Operation of device 100, including operation of laser 16, may be at least partly initiated or dependent upon a mechanical action of the user, such as depressing trigger 18. That is, depressing of trigger 18 can provide a user input signal that is received by the device to initiate an analysis. This or another mechanical action can further provide one or more signals to complementary safety mechanisms 15a-d and associated sensors 17a-d to detect one or more conditions within a sample chamber 20 or elsewhere within device 100 or in its surroundings. Depending on the detected conditions and optionally further input of the user, before or after the conditions determined by sensors 17a-d are evaluated, depressing trigger 18 (possibly for the second time if the further input is requested of, and provided by, the user following a first time of depressing trigger) can operate or fire laser 16.

Some embodiments of LIBS device 100 may also include one or more elements to condition the output of laser 16 (not shown) such as, for example, an element that randomizes the phase of the wavefronts of the laser beam to eliminate "hot spots" of higher laser power in the beam spot. For example, a transmissive optical element divided into randomly distributed zones that differ in optical thickness (e.g. by one half of the wavelength of the laser light) is often referred to as a random phase plate that can effectively diffuse the hot spots.

Figure 2:
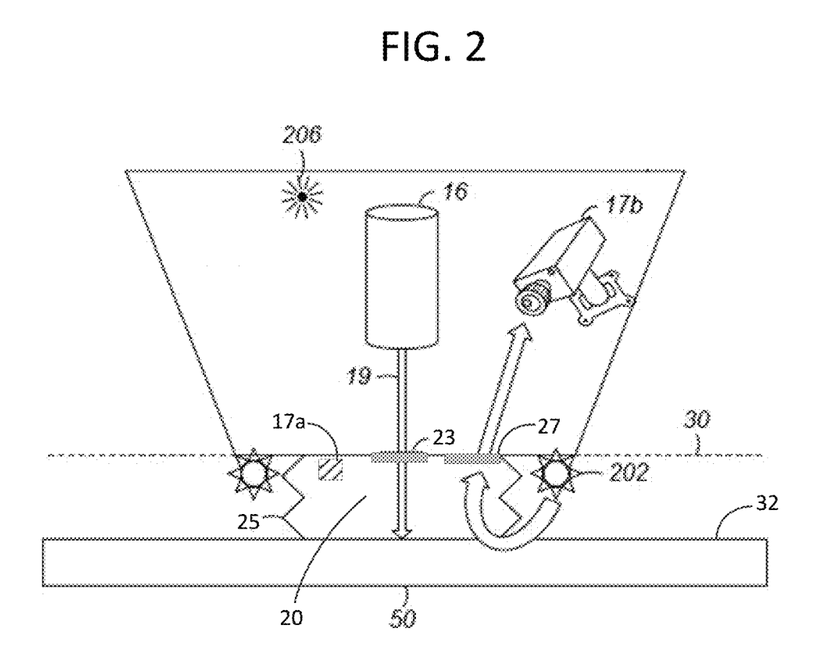
FIG. 2 illustrates the operation of a representative chamber-environment based safety mechanism that detects light intensity within the sample chamber of a LIBS device.

As shown in FIG. 2, laser 16 is configured for directing laser beam 19 through window 23 into sample chamber 20 that is, at least in part, defined by walls of seal 25 (e.g. sample chamber 20 may also include additional space defined by a wall in the nose of device 100 between seal 25 and window 23). Beam 19 then interacts with sample 50 at sample plane 30. In the described embodiments seal 25 may include a flexible tube-like structure configured to engage and create a gas and light tight seal with surface 32 of sample 50. For example, seal 25 may include a "skirt" structure constructed from an elastomeric material that substantially conforms to the features of surface 32, forming a gas and light tight seal with the application of a small degree of pressure.

Also in some embodiments, device 100 can include optical fiber 35 which transmits light emitted by plasma generated from sample 50, upon being subjected to laser beam 19. In particular, optical fiber 35 is coupled to spectrometer 40 that detects the emitted spectral signals that are communicated to the non-transitory computer readable medium to resolve elements and/or compounds present in sample 50. With respect to LIBS devices, certain desired testing conditions (e.g. for detection of light elements such as carbon) require sample chamber 20 to have an inert atmosphere for accurate detection of the spectrum that can be maintained under argon gas pressure that is slightly above ambient pressure. Argon supply 45 may be used to provide this argon gas pressure to sample chamber 20.

Whereas device 100 is shown with four safety mechanisms 15*a-d* and four associated sensors 17*a-d* for determining various conditions within and/or outside of chamber 20 (and possibly outside of device 100), other representative devices may generally have from two to ten safety mechanisms, typically from two to eight safety mechanisms, and often from three to six safety mechanisms. These safety mechanisms 15 are preferably a combination of two or more of a chamber-environment based safety mechanism 15*a*, 15*b*, a sample-position based safety mechanism 15*c*, and a spectral feedback based safety mechanism 15*d*, as described herein. Fault indicators 21, such as warning lights, may be used to signal that at least one of the safety mechanisms 15 has been activated. One or more fault indicators may also be specific, i.e., the fault indicator 21*a* may signal the activation of a specific one of the safety mechanisms, such as the activation of safety mechanism 15*a*. In the particular device illustrated in FIG. 1, four fault indicators 21*a*-21*d* are specific to the safety mechanisms 15*a-d* and may be labeled as such, to warn the user of a specific unsafe, or potentially unsafe, condition that has been detected. Alternatively, such general and/or specific information pertaining to activation of one or more safety mechanisms can be received through display of the appropriate information on user interface 14.

Chamber-Environment Based Safety Mechanisms

A chamber-environment based safety mechanism may be activated, or indicate the detection of an unsafe condition, on the basis of a parameter that is measured within sample chamber 20 of the device. Representative parameters are pressure and light intensity within the chamber. With respect to pressure, some applications of LIBS generally require sample chamber 20 to be maintained in an inert atmosphere, such as provided with argon gas. A chamber pressure interlock configured to measure the degree of positive gas pressure (e.g. overpressure) within chamber 20 may be activated when the measured pressure is below a threshold pressure. Alternatively, a chamber pressure interlock configured to measure the degree of negative gas pressure (e.g. a vacuum) within chamber 20 may be activated when the measured pressure is above a threshold pressure. The threshold pressure may be an absolute pressure (e.g., set at +/−15 psia, +/−15.5 psia, +/−16 psia, +/−16.5 psia, etc.), but preferably the threshold pressure is relative to the ambient (surrounding) pressure, and therefore expressed in terms of a "gauge" (above-ambient or below-ambient) pressure (e.g., set at +/−0.1 psig, +/−0.25 psig, +/−0.5 psig, +/−1 psig, etc.), in which units of "psig" are used to designate pressure in pounds per square inch, gauge). For example, by using a relative threshold pressure, changes in altitude and other factors affecting ambient pressure and the case when a desired condition of a "positive" pressure, such as a slight overpressure of a blanketing inert gas (e.g., argon), existing within the sample chamber, are automatically taken into consideration. The threshold pressure difference may in some cases be controlled or separately input by the user if a given level of overpressure (relative to ambient pressure) is desired.

According to some embodiments, a chamber pressure interlock may be activated in the case of the measured pressure being either below a low threshold pressure or above a high threshold pressure. The measured pressure (e.g., in the range of 0 to 5 psig) may be converted by a pressure sensor/transducer to a proportional voltage that is input to the programming instructions for a processor (CPU) of the device.

A chamber light interlock, on the other hand, may be activated in response to a measured light intensity (e.g., at optical wavelengths and/or possibly other wavelengths) within the chamber that exceeds a threshold light intensity. As with the chamber pressure interlock, the threshold condition may be absolute or otherwise relative to the ambient (surrounding) condition. FIG. 2 illustrates a particular chamber light interlock, in which external light source 202, i.e., being external to sample chamber 20, provides at least a portion of the measured light intensity, which may more specifically be measured by camera 17*b*, acting as the sensor for the chamber light interlock that determines this parameter. The camera may be a micro-camera that can be used for taking images of sample 50. According to this embodiment, camera 17*b* can detect excessive "leakage" of light from external light source 202, which results in a measured light intensity being above the threshold intensity and activation of the chamber light interlock. In particular, camera 17*b* can measure light entering into sample chamber 20 across seal 25 that is positioned peripherally with respect to window 23. Again, seal 25 is configured to provide a seal with surface 32 of sample 50 so that sample chamber 20 is substantially light tight when positioned sufficiently close to sample plane 30. For example, camera 17*b* measures the light intensity in sample chamber 20 (e.g. light passes through window 27 from sample chamber 20) and the non-transitory computer readable medium computes a differential light intensity from measurements from at least two time points. In one embodiment, the difference being namely between an on state at a first time point and an off state at a second time point which may be repeated (e.g. blinking) of light source 202. It will, however, be appreciated that it may not necessary to use an off state due to the fact that only a measurable difference in light intensity is needed for the computation. Further, the light may originate from sources other than source 202. In the described example, modulating the intensity of light from source 202 using a known pattern in time substantially improves the ability to discern the signals and identify the differential light intensity. Activation of the chamber light interlock in this case may occur when the measured differential light intensity is above an allowable threshold value of differential light intensity.

In an alternative embodiment, the chamber light interlock may utilize light source 206 provided with camera 17b (e.g. as a micro flash for taking images of surface 32) to check for light leaks. For example, light source 206 is in optical communication with sample chamber 20 (e.g. through a window, not shown) and a simple implementation of a chamber light interlock may include computing the average intensity of the pixels obtained from the camera image to provide a value for the measured light intensity within the chamber (e.g. the image itself may be irrelevant to the interlock function). In the case of a measured, differential light intensity, the camera flash may be strobed, for example at a known interval. By comparing the resulting, light and dark images, the presence of a light tight seal with surface 32 of sample 50 may be determined based on the chamber being "light" when the flash is on and "dark" when the flash is off. In other words, if sample 50 is not present light would not be reflected from surface 32 back to camera 17b and the image would appear darker. In this manner, the use of a differential intensity as the detected parameter can render the interlock substantially or completely insensitive to the intensity of ambient light. According to more complex implementations, other types of image analysis could be performed using camera 17b, such as an analysis of the sample texture, to verify the presence of sample 50 in the optical path of beam 19 through window 23.

It will be appreciated that light sources 202 and 206 may include any suitable light source known in the related art such as, for example, an LED light source. Further, light sources 202 and 206 may each include one or more lights organized in any arrangement (e.g. light source 202 may include a plurality of lights arranged in a ring around the outer diameter of seal 25).

A pressure sensor 17a for a chamber pressure interlock may likewise be present in sample chamber 20, to provide a particular device having complementary safety mechanisms as described herein. In this case, the combination of external light source 202 or internal light source 206 with camera 17b can provide chamber light interlock 15b to complement chamber pressure interlock 15a (FIG. 1). For example, a clear glass sample placed against seal 25 in the optical path of beam 19 through window 23 may fail to activate chamber light interlock 15b (e.g. due to the transparency of the glass) but nonetheless activates chamber pressure interlock 15a. Accordingly, one or both types of these safety mechanisms 15a, 15b may be used advantageously to prevent the unwanted firing of the laser. Other safety interlocks may be also used to address certain limitations of chamber-environment based safety mechanisms. For example, such limitations may be encountered if chamber sealing and/or pressurization is not possible, such as in the case of samples having insufficient size, irregular surfaces, and/or holes.

Sample-Position Based Safety Mechanisms

A sample-position based safety mechanism may be activated based on a detected condition that is namely a position of sample 50 that exceeds a threshold distance, thereby providing an indication that the sample is excessively far from sample chamber 20 or simply absent. The threshold distance may be a distance of sample 50 from some part of sample chamber 20, such as sample plane 30, or from another part of device 100. The sample-position based safety mechanism, or sample proximity interlock, may be either mechanical or optical and may be activated upon failing to detect the existence of sample material at the relevant location for the associated sensor, with this location often being offset from window 23 (laser output aperture). A sample proximity interlock may comprise a proximity sensor based on the detection of a number of possible phenomena associated with the presence of the sample. In one embodiment, the sensor may be, in particular, an inductive proximity sensor. In this type of sensor, a time-varying current is established in a wire coil by an oscillating circuit. The amplitude of oscillations depends on 1) the drive circuit which can be fixed, 2) the design of the wire coil which can be fixed, and 3) the physical environment surrounding or adjacent to the coil, which can vary according to the presence or absence of magnetic or electrically conductive materials. For example, when a conductive metal is placed near the wire coil, the emitted electromagnetic fields induce electric currents in the metal. The creation of these currents depletes energy from the oscillating circuit driving the wire coil, and the amplitudes of the oscillations diminish. Inductive proximity sensors monitor the amplitude of these oscillations and when changes are detected, the sensor circuit indicates the presence of a conductive sample. The electrical drive-sense circuit is sometimes referred to as an Eddy Current Killed Oscillator (ECKO).

The proximity indication signal of an inductive proximity sensor can be discrete or continuous (increasing with decreased distance between a metallic sample and the coil). Discrete inductive sensors often have a fixed electrical threshold, and are physically adjusted in distance from the metal to produce an indication when metal reaches a fixed distance. A discrete inductive sensor may have a fixed or a programmable threshold established for example through a digital-to-analog converter (DAC). A continuous inductive sensor could be integrated through an analog-to-digital converter (ADC).

As an alternative to an inductive proximity sensor, another type of sensor that may be used in a sample proximity interlock is a mechanical proximity sensor (or mechanical proximity switch), in which electrical contact is made or broken by movement of a switch assembly, in response to the position of the sample. The mechanical proximity sensor may include limit switches. Another type of sensor is a magnetic proximity sensor (or magnetic proximity switch), in which an electrical contact is made or broken depending on the presence of a magnetic field, in response to the position of the sample. This sensor can be mechanical (reed switch) or solid-state (Hall sensor). Yet another type of sensor is a capacitive proximity sensor (or switch) that monitors the signal amplitude of a circuit incorporating a sense capacitor. When material with a dielectric constant different from that of air is brought into proximity to the sense capacitor, the driving signal amplitude varies. Yet another type of sensor is a photoelectric proximity sensor (or photoelectric proximity switch) in which a beam of electromagnetic radiation is reflected from the sample, to detect its position. Yet another type of sensor is an ultrasonic proximity sensor (ultrasonic proximity switch), in which ultrasound waves are reflected from the sample, to detect its position.

Figure 3:
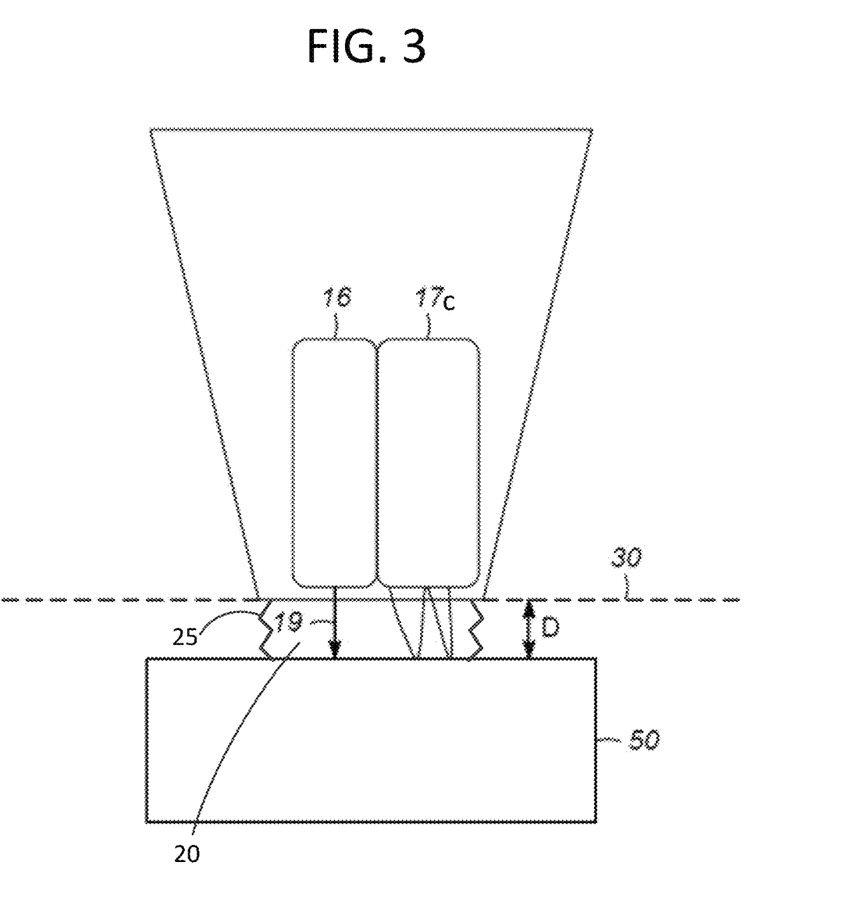
FIG. 3 illustrates the operation of a representative sample-position based safety mechanism that detects a distance of the sample from the plane of the exit of the sample chamber.

FIG. 3 illustrates a representative sample-position based safety mechanism in which a sample proximity sensor 17c is positioned to sense whether a distance D of sample 50 from sample plane 30 exceeds a threshold distance that activates this safety mechanism. Sample proximity sensor 17c can be any of the proximity sensor types described above. As would be appreciated by those skilled in the art having knowledge of the present disclosure, the functioning of certain sensor types, and consequently the sample proximity interlock as a whole, may be impacted by certain sample materials. For example, inductive proximity sensors require metallic samples (e.g. samples are substantially electrically conductive) and magnetic proximity sensors require magnetic samples. Photoelectric proximity sensors require samples with sufficient reflectivity. Accordingly, the use of an additional, complementary safety mechanism can compensate for such limitations of sample-position based safety mechanisms.

Spectral-Feedback Based Safety Mechanisms

A spectral-feedback based safety mechanism may be activated when the spectral distribution, determined by the spectrometer, is indicative of an incorrect sample or no sample being present. In one embodiment, the spectral interlock may prevent unsafe firing of the laser into the air, which causes the recorded spectrum to be similar to a "dark spectrum." A dark spectrum may be obtained, for example, for one or more initial firings of the laser, having a representative firing rate of generally less than every 200 milliseconds, typically less than every 100 milliseconds, and often less than every 50 milliseconds. Alternatively, the spectral interlock may prevent unsafe firing of the laser at a biological tissue, which returns a spectrum characteristic of the tissue. In some embodiments one or more specialized sensors may be included that are dedicated to tissue detection which may include, but are not limited to Near Infra-Red (NIR) sensors capable of detecting proteins, or sensors capable of detecting water such as some types of optical sensor. In these cases laser operation may be prevented after these initial firings. As described above, a spectral interlock may be inadequate on its own, due to the fact that at least one laser pulse is required to obtain the original spectrum for analysis. However, this time may, according to some embodiments, be reduced by exploiting common characteristics of dark spectra, such as the confinement of intensity values to a much narrower range and the considerably greater featurelessness, compared to normal spectra. The spectral feedback mechanism requires at least one firing of the laser in order to gather a spectrum and therefore may be inadequate as the sole safety mechanism however it can provide a valuable secondary safety mechanism in certain types of testing. For example, if the user is testing a thin film (e.g., aluminum foil) all interlocks initially pass, but after some number of laser firings, the sample is ablated and a hole created. The hole is small enough than neither the camera based nor the pressure interlocks activate, but the laser passes thru the hole and creates a hazard. In this case, the spectral feedback interlock triggers after a single shot into open air, without the interlock, there might be hundreds or even thousands of shots into open air.

Measurement Challenges

Certain sample types may have characteristics and/or certain testing conditions may exist that can be associated with a "measurement challenge" that causes one or more safety mechanisms to be activated regardless of whether the testing condition is actually safe or unsafe. For example, an unsafe characteristic of a sample type includes an at least partially transparent (e.g., translucent) sample that allows transmission of enough laser power to be potentially harmful. In such a case a pressure based chamber-environment based safety mechanism may detect a proper degree of pressure and allow the device to operate while a second light based chamber-environment based safety mechanism may detect a light intensity above a threshold value and would become activated to prevent laser firing.

In this regard, aspects of the invention are directed to hand-held devices that can effectively adapt to such measurement challenges, thereby improving the field and flexibility of their use and, importantly, doing so without negatively impacting their safety. A "measurement challenge" can include a "permissible measurement challenge" that indicates a safe circumstance under which operation of the laser should be permitted when one or more safety mechanisms become activated. A measurement challenge may also include an "impermissible measurement challenge" that indicates an unsafe, or at least problematic, testing condition under which operation of the laser should not be permitted when one or more safety mechanisms become "defeated" by the measurement challenge (e.g. do not activate and incorrectly allow operation). As described above, each safety mechanism becomes "activated" when the safety mechanism measures one or more parameters that suggest an unsafe testing condition (e.g. a condition that exceeds some threshold value).

Further, one or more of the safety mechanisms can also be employed for data quality purposes with respect to certain measurement challenges. For example, some sample types require an inert atmosphere within the sample chamber for accurate detection of certain sample types such as those containing light elements (e.g. carbon). Therefore, for applications where detection of light elements is desirable the chamber pressure interlock is highly advantageous to determine that the sample chamber has an overpressure condition indicating that the inert gas is present (e.g. indicative of poor chamber seal and/or gas supply failure). In the present example, it may be highly desirable to utilize chamber pressure interlock for data quality purposes even when it can be defeated by the sample type from a safety perspective. Thus, the chamber pressure interlock could prevent firing of the laser when activated for data quality purposes even when other safety mechanisms indicate that the conditions are safe for firing.

In the embodiments described herein, certain safety mechanisms may be active during every measurement challenge and enabled to prevent operation of the device whenever activated. For example, the chamber light interlock may always be operational to prevent laser firing when activated. In the same or alternative example, the spectral detection interlock may always be active and prevent the laser from continuing to fire when no sample is detected. In either example, the safety mechanisms may not be overridden. For the chamber light interlock this may be due to the fact that if a condition exists where enough light is detected in the sample chamber there is a high likelihood that the laser beam could be released into the environment with the ability to cause harm. Similarly, with respect to the spectral detection interlock if no sample is detected there could be an unsafe condition and/or there may be a problem with one or more elements of the device where continued firing of the laser is pointless if data cannot be collected.

Advantageously, certain combinations of sample type characteristics and/or testing conditions detected by the safety mechanisms can be readily associated with certain measurement challenges. Such combinations can be used as the basis for recognition, by the device, of the existence of these associated measurement challenges. For example, if the chamber pressure interlock is satisfied but the chamber light interlock is activated, the device may determine that a substantially transparent sample is present which makes a gas tight seal with the device but allows transmission of light through it.

In one example, a measurement challenge includes a substantially transparent or at least translucent sample measurement challenge may represent a safety hazard if the laser light beam transmits through the sample with sufficient power to cause harm. As described elsewhere, a chamber pressure interlock may be defeated to improperly allow operation so that the device relies on a inductive interlock and/or a chamber light interlock to ensure safety. In the present example, if either of the chamber light or inductive interlocks activates the device prevents the laser from any firing.

In another example, a measurement challenge includes sample conductivity. If the user desires to test a substantially non-conductive sample (e.g. non-metallic) the inductive interlock would activate and improperly prevent operation of the device. Therefore, for such a measurement challenge the inductive interlock may either be turned off or the activation signal ignored by the device in favor of the signals from the chamber light interlock and chamber pressure interlock. Again, if either of the chamber light or chamber pressure interlocks activates the device prevents the laser from any firing.

In yet another example, the measurement challenge includes a testing condition where the device is incapable of forming a light or gas tight seal between the sample chamber and the sample. This may include a sample that has insufficient size, an irregular or rounded surface, and/or holes, such that it may be difficult or impossible to form a seal with the device that could result in the loss of gas pressure and/or the exit of laser light. It will be appreciated that repeated firing of the laser ablates material at the point of focus of the laser beam and can create a hole through thin samples (e.g. a foil sample). In such a measurement challenge the chamber light interlock and the inductive interlocks may be used for safety and the chamber pressure interlock may be used for assurance of data quality if neither of the light pressure or inductive interlocks activates. In other words, if the device is capable of forming a seal with a conductive sample that satisfies both the light pressure and the inductive interlocks then the device is enabled for safe operation.

In a further example the measurement challenge includes a testing condition where the sample may be moved relative to the testing device (e.g., during the analysis). In such a measurement challenge the chamber light interlock and the chamber light interlocks may be used for safety where the movement causes a detectable loss of gas pressure and/or entrance of light into the sample chamber. Further, the spectral detection interlock may also determine a change in the spectral information indicating that the laser beam is firing at a different spot (e.g. by an increase in noise due to surface contamination). In the present example, this results in the immediate shut down of laser firing to prevent harm.

In a last example, the measurement challenge includes a testing condition where the sample type includes a biological tissue such as when a user may press the device against a surface of a body where the chamber pressure and chamber light mechanisms may be defeated and allow unsafe operation of the device. In terms of safety, preventing such operation can be very important. Again, the device may rely on an inductive interlock to ensure safety so that if the inductive interlock activates the device prevents the laser from firing.

Any measurement challenge, including those specifically described above, may be considered a "permissible" measurement challenge, in which detection of the combination of sample type characteristics and/or testing conditions associated with that challenge can result in the device (or result in instructions such as software, governing the operation of the device) permitting operation of the laser. Otherwise detection of a combination of sample type characteristics and/or testing conditions associated with a permissible measurement challenge can result in the device permitting operation of the laser, depending on additional input received from the user, either before or after detection of the conditions. Detection of a combination of sample type characteristics and/or testing conditions associated with an "impermissible" measurement challenge can result in the device preventing operation of the laser, optionally in combination with providing information (e.g., at the user interface or through a fault indicator) regarding the measurement challenge. With respect to the representative measurement challenges described above, examples of possible measurement challenges may be (i) the sample being transparent or at least translucent, for example with respect to transmission of laser light, (ii) the sample being non-metallic, and (iii) the sample being incapable of sealing the exit of the device (iv) the device being moved relative to the sample, (v) absence of gas supply to the sample chamber, and (vi) the test not requiring gas. Impermissible measurement challenges may be associated with an unsafe circumstance, based on the associated combination of detected conditions, or alternatively may be associated with some other circumstance in which the operation or capability of the device (e.g., in terms of providing a reliable analytical result) may be compromised, such as in the case of a loss of inert gas supply, according to measurement challenge (v).

Matrix of Measurement Challenges with Safety Mechanism Compatibility

From the foregoing description, it can be understood that a number of possible measurement challenges can affect the basis for activation of a given safety mechanism. Also, combinations of such measurement challenges may be associated with different measurement challenges, either permissible or impermissible. Accordingly, in some cases the combinations of safety mechanisms, or interlocks, which are activated by an associated measurement challenge, can be used for identifying the existence of such measurement challenge.

In the described embodiments, some safety mechanisms are incompatible with measurement challenges that include conductive or non-conductive samples, clear or opaque samples, biological tissue, and/or samples having shape or form that prevent formation of an effective seal such as, for example rounded surfaces, holes, or voids. For a particular measurement challenge each safety mechanism may be "Incompatible" (I) with the measurement challenge (e.g. incorrectly allowing operation in an unsafe condition OR preventing operation when safe testing condition exists); or "Compatible" (C) with the measurement challenge (e.g. correctly preventing operation in an unsafe condition OR allowing operation when safe testing condition exists).

| MEASUREMENT CHALLENGE | SAFETY MECHANISM COMPATABILTIY | | | |
| --- | --- | --- | --- | --- |
| | Chamber Pressure Interlock | Chamber Light Interlock | Inductive Interlock | Spectral Detection Interlock |
| Transparent Sample | I | C | C | C |
| Non-Metallic Sample | C | C | I | C |
| Sample Having Small Holes or Irregular Surface | C | C | C | C |
| Sample/Device Movement | C | C | C | C |
| Testing Condition Does Not Require Gas | I | C | C | C |
| Biological Tissue | I | I | C | C |

As is apparent from this table, the measurement challenges that are implicated in the operation of various safety mechanisms may be characterized simply in binary terms, for example on the basis of whether a given measurement challenge is compatible with the safety mechanism as described herein (e.g., providing a "C" input) or not compatible with the safety mechanism (e.g., providing a "I" input). In other embodiments, the measurement challenges may be characterized in quantitative terms, for example according to the actually measured condition (e.g., sample chamber pressure).

Operation of Representative Safety Systems

Figure 4:
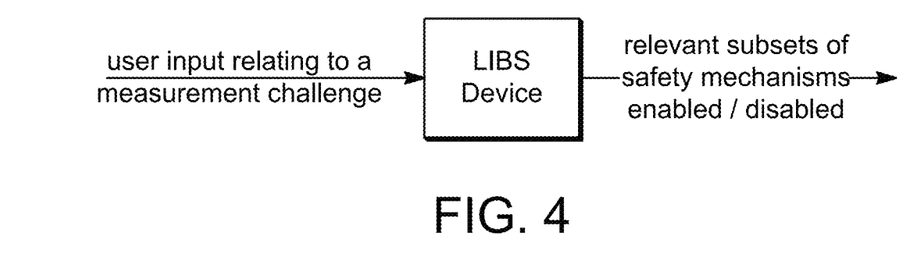
FIGS. 4-7 illustrate possible modes of operation of representative safety systems.

Representative safety systems, comprising two or more complementary safety mechanisms as described above, can advantageously utilize information relating to the detected testing conditions that activate the individual safety mechanisms, for example in the form of a matrix that associates combinations of such detected conditions with respective measurement challenges, as described above. A simple manner of utilizing such information is illustrated in FIG. 4. According to this embodiment, the LIBS device receives user input (e.g., at the user interface) relating to a measurement challenge, such as a transparent sample. Given this input, the device then disables or ignores signals from certain safety mechanisms, based on information stored in the device. More particularly the subset of those safety mechanisms that are incompatible in view of the user input, such as for example the chamber pressure interlock and the conductive sample interlock. The other interlocks (i.e., a residual subset of safety mechanisms) may then remain enabled and effective to perform their designated safety function.

Figure 5:
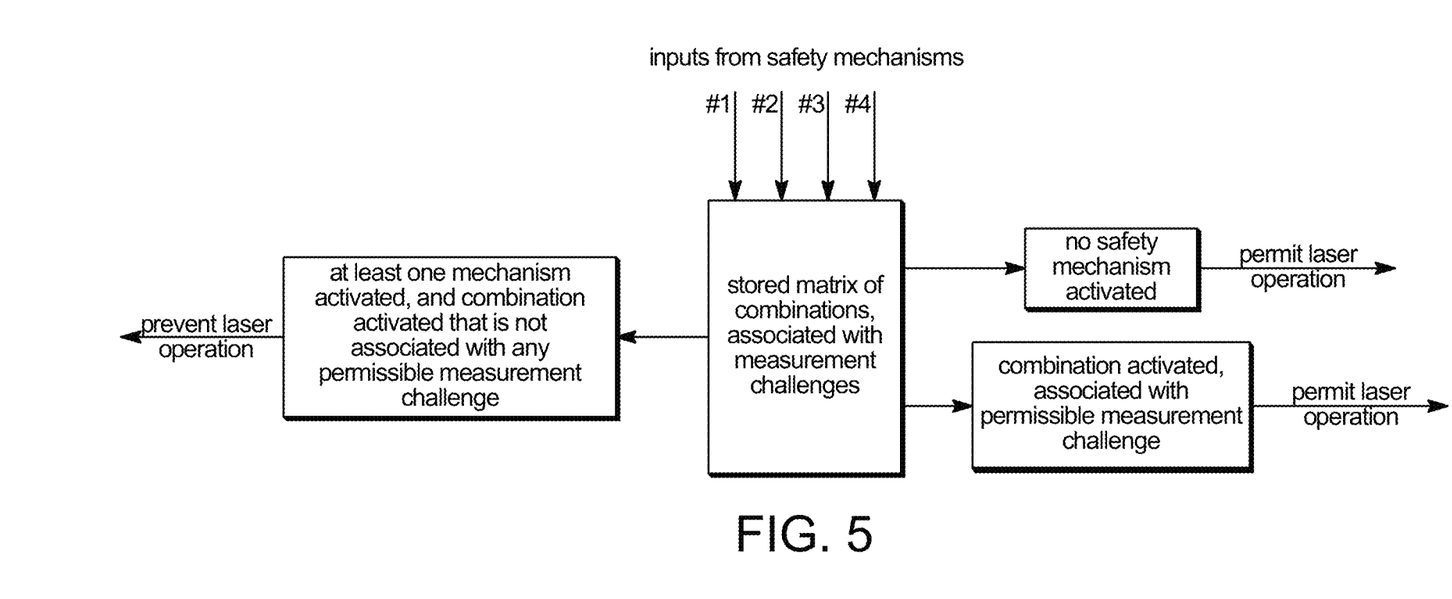

According to the embodiment of FIG. 5, the LIBS device receives inputs (e.g. #1, #2, #3, #4) from the two or more complementary safety mechanisms and associates these inputs (each being indicative of a respective, detected testing condition as described above) with a stored matrix of combinations of these testing conditions. In the case of no safety mechanism being activated, laser operation may be permitted. Laser operation may also be permitted if the combination of detected conditions (activating the combination of safety mechanisms that detect these testing conditions) is associated with a permissible measurement challenge. On the other hand, if at least one safety mechanism is activated, and the combination of safety mechanisms that is activated is not associated with any permissible measurement challenge, then laser operation may be prevented. The embodiment of FIG. 6 can further improve specificity and robustness of a safety system, compared to the embodiment of FIG. 5, by adding a user input of one or more measurement challenge(s) ("input measurement challenge(s)") as a further received input. Such input may, for example, require a user to select from a menu of choices displayed on the user interface (e.g., "TRANSPARENT" or "NON-METALLIC") This input may likewise be used in the embodiment of FIG. 4, as a basis for disabling or ignoring signals from a subset of the safety mechanisms. In the case of the embodiment of FIG. 6, laser operation may be permitted in the cases of (i) no safety mechanism being activated, or (ii) the combination of compatible safety mechanisms being associated with the input measurement challenge(s) allowing operation. On the other hand, if at least one safety mechanism is activated, and the combination of compatible safety mechanisms that is activated is not associated with allowable operation for the input measurement challenge, then laser operation would be prevented.

Figure 6:
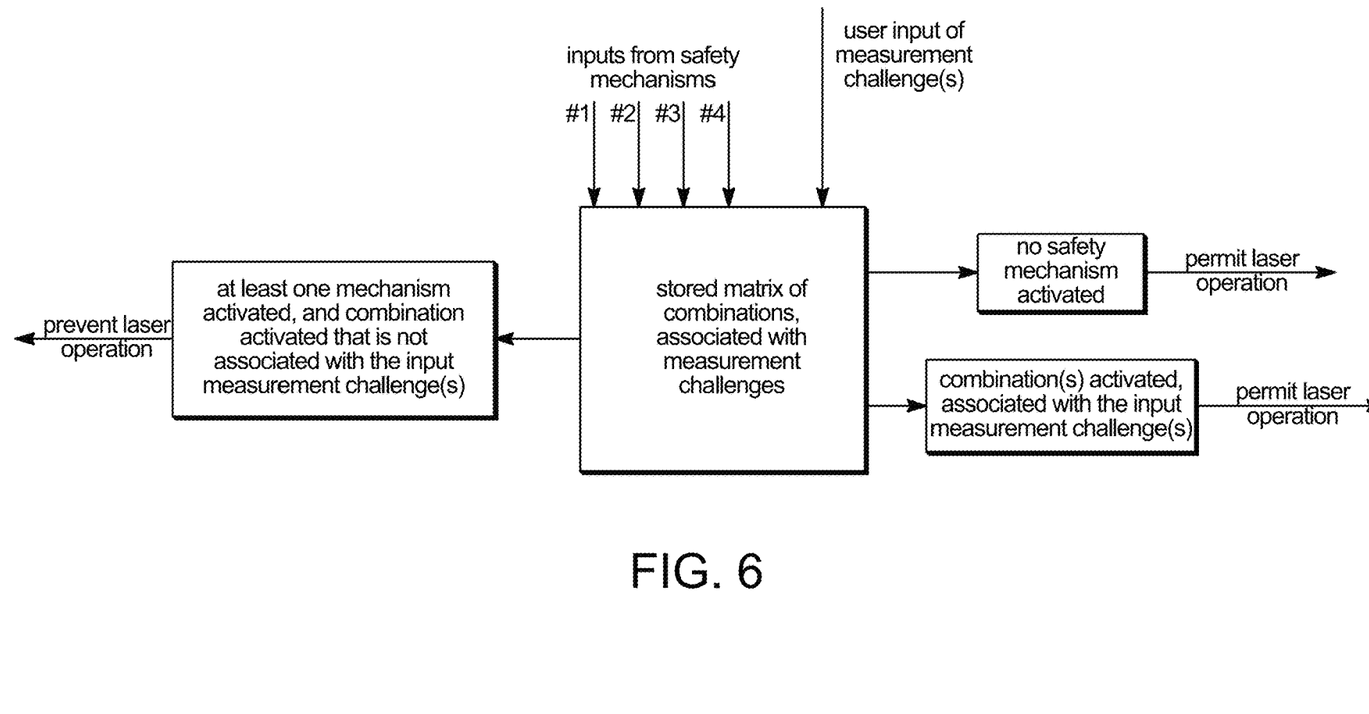
Figure 7:
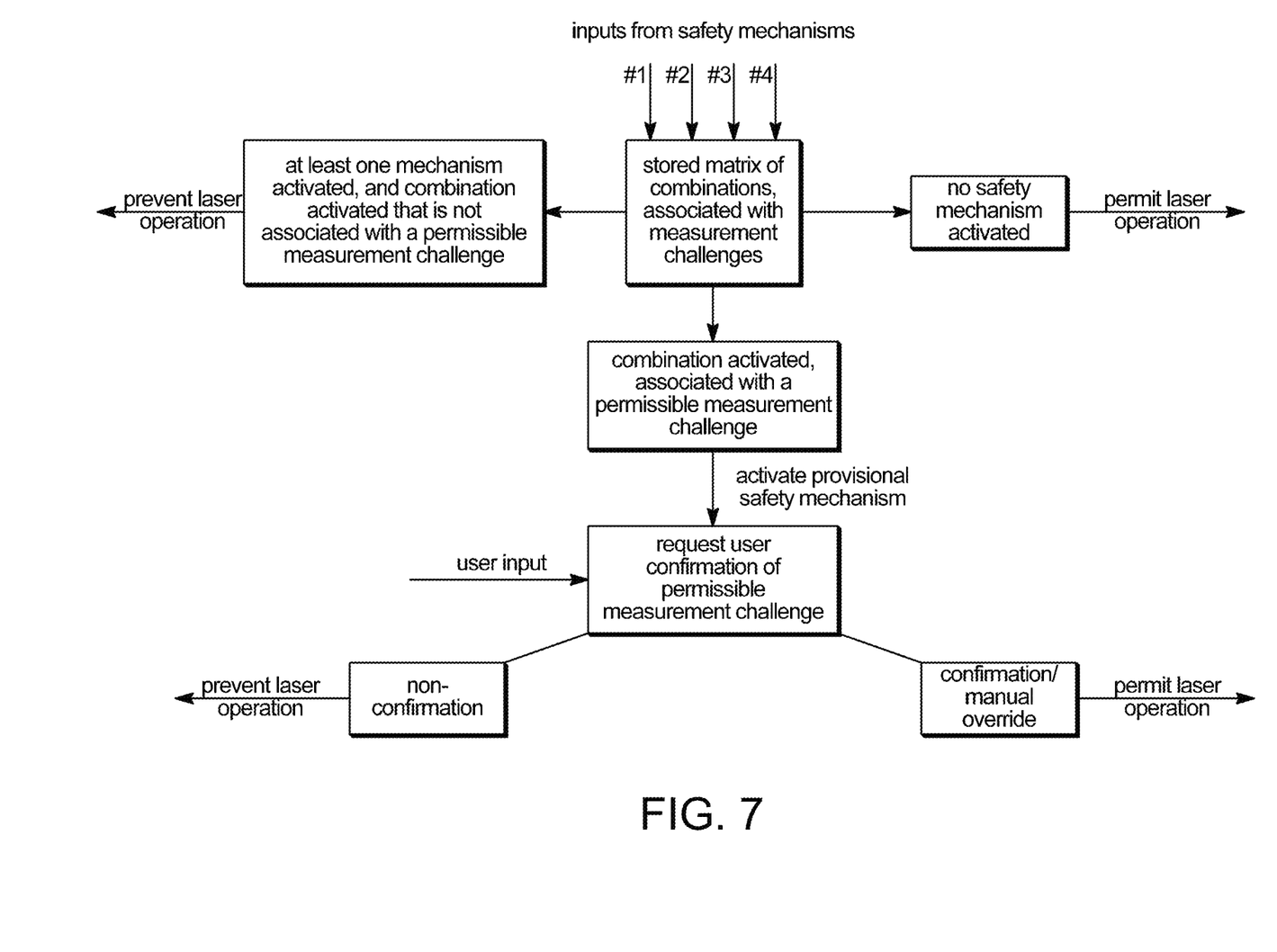

FIG. 7 provides yet another alternative operation of a safety system, in which, compared to the embodiment of FIG. 6, user input can be provided at a later time in the process, namely in response to a request relating to a potential, permissible measurement challenge being identified. In particular, the device receives inputs from the safety mechanisms, as in the embodiments of FIGS. 5 and 6. If no safety mechanism is activated, then laser operation may be permitted, whereas if at least one safety mechanism is activated and the combination of safety mechanisms that are activated is not associated with a permissible measurement challenge, then the laser operation may be prevented. On the other hand, if the combination of safety mechanisms that is activated is associated with a permissible measurement challenge, then a provisional safety mechanism may be activated and potentially overridden, depending on the user input. According to one embodiment, the device may provide an output of (e.g., display at the user interface) potential, permissible measurement challenge and request the user's confirmation (e.g., entry at the user interface) of the measurement challenge in order to override the provisional safety mechanism. For example, the user interface may display "REQUIRE GAS?" and allow the user to select "CONFIRM" to manually override the provisional safety mechanism, permitting laser operation. According to some embodiments, the provisional safety mechanism can be overridden with some other action of the user, such as unlocking a trigger safety that has become locked upon detection of the permissible measurement challenge. A request pertaining to such action might be output, for example, in a message displayed on the user interface, such as "TRIGGER LOCKED, CONFIRM GAS REQUIRED AND SAFE LINE OF FIRING BEFORE UNLOCKING." In the absence of the user's further input confirming the measurement challenge, the provisional safety mechanism may prevent laser operation.

Overall, aspects of the invention are directed to safety systems and methods (e.g., implemented using software and/or hardware components) in which the two or more safety mechanisms are complementary such that, compared to these mechanisms acting alone, they improve the chance that unsafe operation will be avoided and/or improve the chance that lockout will be avoided when safe operation is possible. Those having skill in the art, with the knowledge gained from the present disclosure, will recognize that various changes can be made to the disclosed devices and associated safety systems and modes of operation, in attaining these and other advantages, without departing from the scope of the present invention. As such, it should be understood that the features described herein are susceptible to modification, alteration, changes, or substitution. The specific embodiments illustrated and described herein are for illustrative purposes only, and not limiting of the invention as set forth in the appended claims.

What is claimed is:

1. A laser induced breakdown spectroscopy (LIBS) device, comprising:
    a laser configured to direct a laser beam through a sample chamber to a surface of a sample, and
    a spectrometer configured to detect a spectral distribution of emissions from the sample in response to the laser beam;
    a plurality of safety mechanisms comprising at least two of a chamber pressure based safety mechanism, a chamber light based safety mechanism, an inductive proximity sensor, and a spectral-feedback based safety mechanism;
    a user interface comprising a menu of choices that include a plurality of measurement challenges associated with a LIBS analytical technique, wherein the user interface is configured to receive a user selection of a measurement challenge from the menu; and
    a processor configured to associate the selected measurement challenge with one or more of the safety mechanisms compatible with the selected measurement challenge and prevent operation of the laser if at least one of the compatible safety mechanisms is activated, wherein the selected measurement challenge is associated with one or more of the safety mechanisms incompatible with the selected measurement challenge and the incompatible safety mechanisms are shut off or signals therefrom are ignored by the processor.

2. The device of claim 1, wherein the chamber pressure based safety mechanism is activated when a measured pressure within a sample chamber is below a threshold pressure.

3. The device of claim 2, wherein the threshold pressure is relative to ambient pressure.

4. The device of claim 1, wherein chamber light based safety mechanism is activated when a measured light intensity within a sample chamber exceeds a threshold light intensity.

5. The device of claim 4, wherein a light source external to the sample chamber provides at least a portion of the measured light intensity.

6. The device of claim 4, wherein the measured light intensity is a differential light intensity, between on and off states of a light source configured to provide light within the sample chamber.

7. The device of claim 1, wherein the one or more compatible safety mechanisms include the chamber pressure based safety mechanism that is activated when the detected parameter within the sample chamber is a measured pressure that is below a threshold pressure, and the chamber light based safety mechanism that is activated when the detected parameter within the sample chamber is a measured light intensity that exceeds a threshold light intensity.

8. The device of claim 1, wherein the inductive proximity sensor is activated when the sample is non-metallic.

9. The device of claim 1, wherein the spectral-feedback based safety mechanism is activated when the spectral distribution is indicative of an incorrect sample.

10. The device of claim 1, wherein operation of the laser is prevented when at least one compatible safety mechanisms is activated in a combination of two or more of the compatible safety mechanisms, the combination including at least one of the compatible safety mechanisms not being activated.

11. The device of claim 1, wherein operation of the laser is permitted for a given measurement challenge that activates one or more of the incompatible safety mechanisms.

12. The device of claim 1, further comprising one or more fault indicators that signal an activation of at least one of the compatible safety mechanisms.

13. The device of claim 12, wherein the one or more fault indicators signal the activation of a specific one of the compatible safety mechanisms.

14. The device of claim 1, wherein (i) the chamber light based safety mechanism or the chamber pressure based safety mechanisms is activated based on one or more detected parameters within the sample chamber or (ii) the conductive sample based safety mechanism is activated based on a detected conductive property of the sample, and further wherein the one or more detected parameters in (i) or the detected conductive property in (ii), respectively, occurs at a time that a user input signal is received to initiate an analysis.

15. The device of claim 1, wherein the measurement challenge comprises at least two of (i) the sample being substantially transparent or translucent, (ii) the sample being non-metallic, (iii) absence of gas supply to the sample chamber, and (iv) the sample being biological tissue.

* * * * *

UNITED STATES PATENT AND TRADEMARK OFFICE
CERTIFICATE OF CORRECTION

PATENT NO. : 10,883,921 B2  
APPLICATION NO. : 16/036286  
DATED : January 5, 2021  
INVENTOR(S) : Michael Bush et al.

It is certified that error appears in the above-identified patent and that said Letters Patent is hereby corrected as shown below:

Column 20, Claim 10, Line 19, delete "safety mechanisms is" and insert -- safety mechanism is --, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*